United States Patent [19]

Rae

[11] 3,716,621
[45] Feb. 13, 1973

[54] DEUTERIUM-HYDROGEN MONOTHERMAL EXCHANGE

[75] Inventor: Howard Keith Rae, Deep River, Ontario, Canada

[73] Assignee: Atomic Energy of Canada Limited, Ottawa, Ontario, Canada

[22] Filed: April 3, 1970

[21] Appl. No.: 25,497

[30] Foreign Application Priority Data

April 8, 1969    Canada..................047,998

[52] U.S. Cl..................23/193, 260/563 R
[51] Int. Cl. ......C01c 1/00, C07c 87/06, C07c 87/14
[58] Field of Search..........23/193, 210 I, 212 R, 220; 260/563 R

[56] References Cited

UNITED STATES PATENTS 3,457,041    7/1969    Klein et al. .............................23/211

FOREIGN PATENTS OR APPLICATIONS 619,092    4/1961    Canada..................23/210 I
1,125,670  8/1968    Great Britain .........23/210 I Primary Examiner—Oscar R. Vertiz
Assistant Examiner—Hoke S. Miller
Attorney—Stevens, Davis, Miller & Mosher

[57]    ABSTRACT

A monothermal exchange process of extracting deuterium from ammonia synthesis gas includes passing the gas through an exchange liquid stream consisting of a liquid amine having up to five carbon atoms per molecule to cause deuterium to be transferred from the synthesis gas to the exchange liquid and removing a stream of exchange liquid enriched in deuterium therefrom.

2 Claims, 1 Drawing Figure

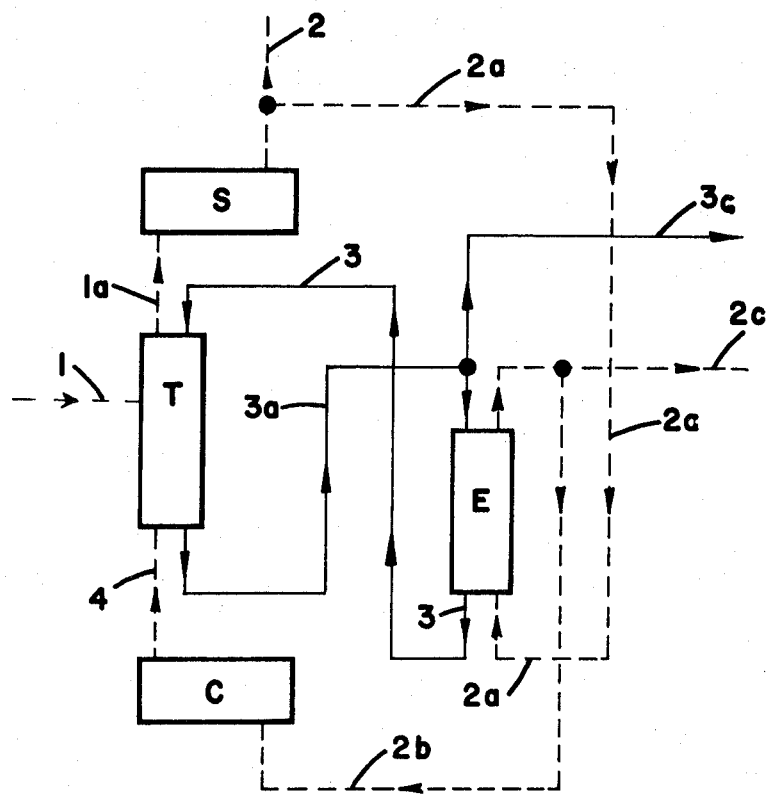

DEUTERIUM-HYDROGEN MONOTHERMAL EXCHANGE

This invention relates to the extraction of deuterium from a gas stream containing hydrogen, deuterium and nitrogen. The feed gas may be of any commercial gas stream containing significant amounts of hydrogen. Such streams will usually contain nitrogen.

There is frequently a significant amount of deuterium in the gaseous mixture of nitrogen and hydrogen prepared for subsequent synthesis to ammonia and various processes have been proposed for extracting some of the deuterium from the synthesis gas. In some of these processes, the synthesis gas is passed in deuterium exchanging relationship with an exchange liquid at a single temperature only, as compared to those processes in which deuterium exchange between the synthesis gas and the exchange liquid takes place at two different temperatures. This invention relates to processes of the former kind, that is to say monothermal processes.

According to this invention, a monothermal exchange process of extracting deuterium from ammonia synthesis gas includes passing the gas through an exchange liquid stream of a liquid amine having up to five carbon atoms per molecule to cause deuterium to be transferred from the synthesis gas to the exchange liquid.

Deuterium may be removed from the exchange liquid by passing a stream of gaseous ammonia through the exchange liquid. This stream of gaseous ammonia is preferably obtained from a synthesis process in which ammonia is synthesized from the synthesis gas which has been employed in the monothermal process defined above and had much of its deuterium removed. The passage of the stream of gaseous ammonia through the exchange liquid enriches the gaseous stream in deuterium, and therefore it is advantageous to crack this enriched ammonia into nitrogen and hydrogen to reform synthesis gas and to use this reformed synthesis gas in the monothermal process defined above.

One embodiment of the present invention will now be described, by way of example, with reference to the accompanying drawing, which shows a flow diagram of a process for extracting deuterium from synthesis gas.

Referring to the drawing, a stream 1 of ammonia synthesis gas containing nitrogen and hydrogen in the ratio of approximately one to three by volume is passed into the upper part of an exchange tower T and, after passing upwardly through the upper part of the tower T, leaves from the top as stream 1a and is passed to a synthesis plant S in which the nitrogen and hydrogen is synthesized to ammonia. Ammonia leaves the synthesis plant S in a stream 2.

A stream 3 of exchange liquid formed by 1-2 diaminopropane containing the potassium alkyl amide of 1, 2 - diaminopropane as catalyst is passed downwardly through the exchange tower T and, after leaving tower T, is passed downwardly as stream 3a through a further exchange tower E. A stream 2a of gaseous ammonia is taken from the output stream 2 and is passed upwardly through the exchange tower E and, after leaving tower E, is passed as stream 2b to a cracking plant C in which the ammonia is cracked into nitrogen and hydrogen to re-form synthesis gas. The reformed synthesis gas is fed in a stream 4 to the bottom of the exchange tower T, and passes upwardly through the tower T, joining the synthesis gas stream 1 in the upper part.

In the exchange tower T, both streams 1 and 4 of synthesis gas lose deuterium to the stream 3 of exchange liquid. During the subsequent passage of exchange liquid through the exchange tower E, the exchange liquid loses deuterium to the stream 2a of ammonia gas, which is subsequently cracked and passed into the exchange tower T.

The stream 3a of exchange liquid flowing from the exchange tower T to the exchange tower E contains a significant amount of deuterium and a stream 3c may be taken therefrom for further enrichment or use. In this case, a stream of exchange liquid must be supplied to the stream 3 to compensate for the liquid removed. Similarly, the stream 2b of ammonia gas passing from the exchange tower E to the cracking plant C contains a significant amount of deuterium, and a stream 2c of this may be taken for further enrichment or use, a suitable replenishing supply being provided.

In one example of this process, the stream 1 of synthesis gas contained 120 ppm (parts per million) of deuterium as compared to hydrogen (i.e. an atom ratio of D to H of 120 to $10^6$) as it entered the exchange tower T, and this was reduced to 32 ppm in the stream 1a of synthesis gas leaving the tower T. The stream 3 of exchange liquid entering the exchange tower T contained 40 ppm deuterium, and this increased to 4,800 ppm in the stream 3a leaving the tower T. The stream 2a of ammonia gas entering the tower E contained 32 ppm deuterium and this increased to 4,400 ppm in the stream 2b leaving the tower E. The temperature of the exchange tower T was −30°C and in the exchange tower E it was +50°C.

Other amines which are suitable for use as the exchange liquid are 1-2 diaminoethane and 1-3 diaminopropane. Mixtures of amines are also useful, especially eutectic mixtures. The use of these liquids is the subject of U.S. patent application Ser. No. 25,343, filed Apr. 3, 1971, naming A.R. Bancroft and W.E. Lockerby as inventors, and entitled "Deuterium-Hydrogen Exchange using Diamines."

The catalyst may be an alkyl amide of lithium, sodium, potassium, rubidium or cesium. For example, the catalyst may be lithium amide, sodium amide, potassium amide, rubidium amide or cesium amide.

I claim:

1. A monothermal process for extracting deuterium from an ammonia synthesis gas which comprises passing said gas through an exchange liquid stream selected from the group consisting of monoamines and diamines having up to five carbon atoms and containing in solution an alkyl amide of lithium, sodium, potassium, rubidium or cesium as exchange catalyst, causing deuterium to be transferred from the synthesis gas to the exchange liquid stream, passing gaseous ammonia through said exchange liquid enriched in deuterium to cause deuterium to be transferred to the ammonia gas, cracking at least a portion of the deuterium-enriched ammonia gas to produce deuterium-enriched synthesis gas, passing said deuterium-enriched synthesis gas through said exchange liquid stream to transfer deuterium therefrom to said exchange liquid, converting synthesis gas of reduced deuterium content to ammonia and passing a portion of the gaseous ammonia of reduced deuterium content so synthesized for exchange with said deuterium-enriched exchange liquid, and removing a stream of deuterium-enriched ammonia gas or exchange liquid enriched in deuterium as product.

2. The process as claimed in claim 1 in which the exchange liquid is a diamine or a mixture of diamines.

* * * * *